Patented Jan. 1, 1929.

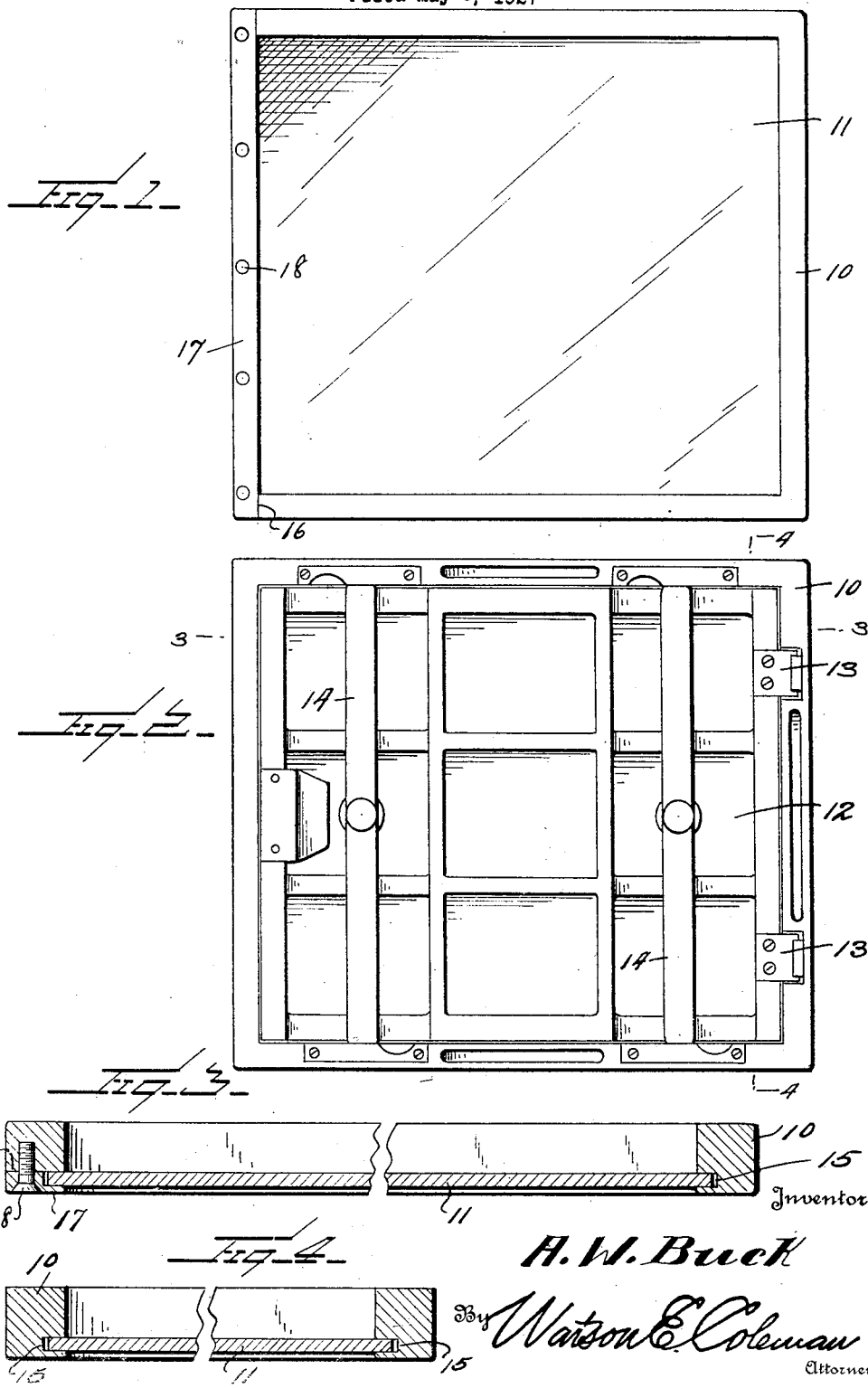

1,697,381

UNITED STATES PATENT OFFICE.

ARTHUR W. BUCK, OF ST. LOUIS, MISSOURI.

X-RAY CASSETTE.

Application filed May 3, 1927. Serial No. 188,542.

This invention relates to cassettes such as are used in X-ray photography for holding a flourescent intensifying screen and a sensitive plate in contact. One of the main necessities in cassettes is that the flourescent side of the screen shall be held in contact with the sensitive side of the plate or film as if the two surfaces are not in contact the image will be blurred or have a confusing appearance lacking detail. For several years now these cassettes have been made with a front plate of a product of phenol condensation instead of the sheet aluminum plate such as shown in my Patent 1,507,727 granted September 9, 1926. Such a product offers less resistance to the X-ray than does the aluminum sheet and when placed next to the patient's skin it does not have the same chilling effect that aluminum has. Furthermore this phenol condensation product does not dent if accidently struck by the corner of another cassette or receives a bump in the process of routine handling and this is common where an aluminum front or plate is used. Furthermore no matter how tightly aluminum is stretched over the frame of the cassette, in course of time, the aluminum is inclined to expand or stretch further so that the fronts of the larger sizes of cassettes bulge slightly thereby causing poor contact between the films and the screens.

While the phenol condensation product is better in respects above noted than aluminum as a front for the cassette, yet it has one important disadvantage; it will sooner or later warp or buckle when attached at its margins to the aluminum frame. This is due to the fact that there is a slight difference between the index of expansion and contraction of such phenol condensation product and that of aluminum so that under certain temperatures, a considerable stress is set up by the unequal expansions and contractions of the phenol condensation product or composition front which cause the composition to buckle on the aluminum frame. Furthermore all composition plates that are now in use and as far as is known to me are attached directly to the cassette frame by a row of screws around the outer edges of the composition sheet. There is, therefore, a certain amount of stress in the said composition between the screen. This is due to the fact that screw heads are rarely absolutely central with the screw itself even though the holes for placing the screws may be drilled through the composition into the cassette frame in one operation. This means that while the holes are in line properly, the heads of the screws are somewhat eccentric and as a consequence, this sets up unequal stresses in the composition front.

The general object of the present invention, therefore, is to provide a phenol condensation product front in a cassette, the front being so mounted so that it will not be subject to any stresses by the expansion or contraction of the aluminum frame, but will be free to expand or contract on its own account independently of the frame, and further to so mount the composition front in the frame that the margins of the front will be entirely free from direct attachment to the frame and will not be pulled inequally by screws, rivets or the like. To this end I have provided a sectional frame having a groove within which the margin of the composition front is disposed and fitted, the two sections of the frame being afterwards joined to each other so as to constitute practically a solid frame, but permitting the composition front to expand and contract independently.

My invention is illustrated in the accompanying drawings, wherein:—

Fig. 1 is a face view of a cassette constructed in accordance with my invention;

Fig. 2 is a rear view thereof;

Fig. 3 is a section on the line 3—3 of Fig. 2;

Fig. 4 is a section on the line 4—4 of Figure 2; the back plate of the cassette being removed.

Referring to these drawings, it will be seen that the cassette is of the usual rectangular form and comprises the rectangular frame 10, the composition front 11 and the back 12. The back is formed of aluminum and is, of course, covered with felt on its inside face. The back is hinged to the frame by the hinges 13 preferably formed of leather though this has nothing to do with my present invention and the back may be hinged to the frame as illustrated in my prior patent. The back is held closed against the composition front or plate 11 by means of the usual pivoted spring clamps 14.

The subject-matter of the present invention particularly resides in the manner in which the composition front or plate 11 is held in place within the frame 10. To this end the frame is formed with a sheet receiving groove 15 which extends around the inside of the frame. At one end, the main body of the frame is cut away as at 16 so that the frame does not define the full groove 15. The bottom and one side wall of the groove are formed by a strip 17 of aluminum disposed against this portion of the frame as illustrated in the section view, Figure 3, and this strip 17 of aluminum is held to the body portion of the frame by the screws 18 or held in place by other suitable means. This permits the sheet of phenol condensation product to be inserted into the groove 15 and then the strip 17 disposed over the margin of the sheet and attached in place as shown in Figure 3, thus completing the frame. This permits the frame to be easily formed so as to hold the composition sheet without in any way attaching the sheet directly to the frame by means of rivets, screws or any other fastening devices which pass through the sheet. While the composition sheet is held snugly in the frame against longitudinal movement, the composition sheet is free to expand or contract independently of the frame and the frame to expand or contract independently of the sheet. Thus the composition plate or sheet "floats" within the cassette frame, the grooves in the frame being large enough so as to take care of the differences in contraction and expansion between the frame and the sheet. The sheet is held in place without rigidly attaching to the frame and by attaching the face piece or strip 17 to the body of the frame by screws it may be easily removed should it become necessary at any time to put in a new sheet. I do not wish to be limited to the use of the screws however, as rivets might be used for this purpose. Otherwise than stated in the claims I do not wish to be limited to the exact construction illustrated.

I claim:—

1. A cassette including a rectangular frame, three sides of the frame having a groove upon the inside face of the frame, the fourth side of the frame being cut away on the level with one wall of the groove, a facing strip adapted to be disposed against the face of the last named portion of the frame and attached thereto and formed to provide the other wall of the groove, and a plate of composition disposed with it margins in said groove, the groove being of sufficiently greater depth than the projection of the plate into the groove to permit the plate to expand and contract independently of the frame.

2. A cassette including a metallic frame and a composition plate, the frame having grooves and the margins of the composition plate being inserted in said grooves, the grooves being of sufficiently greater depth than the projection of the composition plate into the grooves to permit the composition plate to expand or contract independently of the frame.

In testimony whereof I hereunto affix my signature.

ARTHUR W. BUCK.